United States Patent [19]

Vogelman et al.

[11] 3,736,369

[45] May 29, 1973

[54] TECHNIQUE FOR ENCODING AND DECODING SCRAMBLED T.V. TRANSMISSIONS BY THE SIMULTANEOUS TRANSMISSION OF THE ENCODING AND DECODING SIGNALS

[75] Inventors: Joseph H. Vogelman, Roslyn; Ira Kamen, Lloyd Harbor, both of N.Y.

[73] Assignee: Theatre Vision, Inc., Woodbury, N.Y.

[22] Filed: Mar. 13, 1972

[21] Appl. No.: 234,014

[52] U.S. Cl. .................................178/5.1, 340/149 A

[51] Int. Cl. ..................................................H04n 1/44

[58] Field of Search ......................178/5.1; 179/1.5 S, 179/65 CB; 340/280, 149 A

[56] References Cited

UNITED STATES PATENTS

| | | | |
|---|---|---|---|
| 3,689,688 | 9/1972 | Shanahan et al. | 178/5.1 |
| 3,601,528 | 8/1971 | McVoy | 178/5.1 |
| 3,184,537 | 5/1965 | Court et al. | 178/5.1 |
| 3,274,333 | 9/1966 | Shanahan | 178/5.1 |
| 3,387,265 | 6/1968 | Smeiman | 340/149 A |
| 2,923,764 | 2/1960 | Druz et al. | 178/5.1 |
| 3,081,376 | 3/1963 | Loughlin et al. | 178/5.1 |
| 3,274,333 | 9/1966 | Shanahan | 178/5.1 |
| 3,500,373 | 3/1970 | Minasy | 340/280 X |
| 3,116,363 | 12/1963 | Doundoulakis | 178/5.1 |
| 3,225,142 | 12/1965 | Schroeder | 178/5.1 |
| 2,312,897 | 3/1943 | Guanello et al. | 179/1.5 |
| 3,184,538 | 5/1965 | Court | 178/5.1 |
| 2,977,434 | 3/1961 | Shanahan et al. | 178/5.1 X |
| 3,011,015 | 11/1961 | Shanahan et al. | 178/5.1 |

*Primary Examiner*—Benjamin A. Borchelt
*Assistant Examiner*—A. M. Psitos
*Attorney*—Nichol M. Sandoe, Roy C. Hopgood, John M. Calimafde et al.

[57] ABSTRACT

A subscriber television system in which the television signal is encoded at the transmitter in a manner that causes the video and/or audio portion of the signal to be received in a scrambled form at the receiver. A decoder at the receiver operates in response to the subscriber's use of a program-select and decoding element having a conducting pattern thereon. When a program-select ticket having the proper conducting pattern is utilized, a network on the decoder produces an enabling signal which actuates the decoding or unscrambling circuitry at the receiver to thereby decode the received, scrambled signal.

12 Claims, 8 Drawing Figures

TECHNIQUE FOR ENCODING AND DECODING SCRAMBLED T.V. TRANSMISSIONS BY THE SIMULTANEOUS TRANSMISSION OF THE ENCODING AND DECODING SIGNALS

The present invention relates generally to communications, and more particularly to a system for unscrambling (or decoding) a previously scrambled (or encoded) television signal through the use of a decoding element.

Several techniques have been employed in the past to enlarge the selection of entertainment and educational material that is made available to owners of television receivers beyond that generally broadcast by the major networks and local television stations. These prior techniques usually involved the transmission of supplemental programs either over the air or over a cable. The subscriber was required to pay a fee to the system operator to enable him to receive and view the additional programs at his home receiver.

In one form of pay-television that has previously been developed and employed, a scrambled television program is transmitted which could be viewed at a normally idle channel in the VHF band only as a scrambled and thus incomprehensible picture. The subscriber-viewers are each provided with a coin-operated device coupled between the receiving antenna and the television receiver which, upon the insertion of a specified coin, unscrambled the video and/or audio portion of the program for a specified time, to thereby enable the subscriber to view an unscrambled television program for that time. After the expiration of that time period, the received television picture would once again become scrambled until the subscriber inserted another coin into the unscrambler device.

This approach to pay television broadcasting has thus far met with only limited acceptance, largely as a result of the need for the system proprietor to periodically collect the coins from each subscriber's unscrambler device, and the inability of the proprietor to charge the subscribers different prices for the privilege of viewing different programs. For example, the system proprietor may reasonably wish to charge the subscribers a higher, premium rate for the privilege of viewing a first-run film that has received critical acclaim, or an important sports event, such as a championship boxing match, as compared to a second-run movie or sports event of only marginal interest.

Operators of the earlier scrambling pay-television systems, and operators of the more commonly available cable-television and CATV systems as well, are generally unable to differentiate in the rates charged to their subscriber-viewers for the privilege of watching programs of more than usual interest. In addition, the conventional, coin-operated unscrambling system could be operated only for fixed time periods for each coin deposited. This period often expired before the completion of the program, at which time the subscriber had to hunt for and insert an additional coin in the unscrambler to enable him to view the remainder of the program. This need is at least an annoyance to the viewer as it created a temporary interruption in his viewing, and may be a more serious irritation if the viewer could not find an additional coin in time to view the remainder of the program.

It is an object of the present invention to provide an improved program unscrambler or decoding device for use in a television communications system which does not require the use of a coin-operated device.

It is a further object of the invention to provide a television broadcast system of the type described in which the subscriber-viewer may be charged different rates for the privilege of viewing programs having different levels of interest.

It is another object of the invention to provide a television system of the type described in which the subscriber may purchase tickets for viewing certain programs in his home, much in the manner in which he would purchase tickets at a movie house or a theatre.

In accordance with the invention, a television signal is scrambled at a transmitter and transmitted in scrambled form to a receiver. The latter includes means for unscrambling the received television signal which operates in response to the use of a program select ticket which the subscriber has previously acquired. The ticket contains a conducting area which, in conjunction with a network in the unscrambler or decoder, produces an enabling signal. That signal operates an unscrambling circuit which in turn unscrambles the received television signal. The thus unscrambled signal can be viewed on a selected channel, preferably one that is not in general use for television reception, of a conventional television receiver.

In one embodiment of the invention herein described, the vertical sync pulse is removed from the transmitted signal with the result that the received television signal cannot be properly synchronized and is thus incomprehensible. At the receiver, an unscramble-enabling signal, generated upon the use of the program select ticket, restores a synchronizing pulse to the received television signal, and the resulting reconstructed television signal can be viewed at the television receiver.

In another embodiment of the invention herein described, an interference signal is applied along with the video to a variable attenuator which attenuates the video signal by an amount corresponding to the instantaneous value of the interference signal. The thus scrambled signal is transmitted to the receiver at which the interference signal is detected and inverted upon the production of an enabling signal when the program select ticket is employed as described above. The inverted interference signal is applied to a variable attenuator which produces a reverse attenuation on the once-attenuated video signal, to thereby restore the video signal to its original unscrambled form.

As described in a co-pending application, entitled Technique For Encoding and Decoding T. V. Transmissions by Means of a Coded Electronic Ticket, Ser. No. 221,700, filed on Jan. 28, 1972, and assigned to the assignee of the present application, the receptacle into which the program select ticket is inverted includes a tuned or resonant circuit having a pair of conducting plates that normally establish a reference capacitance. When a conducting area on the ticket is placed proximate to these plates, the value of the tuned circuit capacitance is modified to thereby vary the resonant frequency of the circuit. The ticket-receiving receptacle includes two such networks or circuits which when thus modified respectively produce a program select and an unscrambling or decode-enabling signal, to thereby permit the received scrambled television signal to be unscrambled and viewed.

To the accomplishment of the above and to such further objects as may hereinafter appear, the present invention relates to a technique for encoding and decoding scrambled television signals, as defined in the appended claims and as described in the following specification taken together with the accompanying drawings in which:

FIG. 1(*b*) is a schematic diagram in block form of a receiver containing means, according to one embodiment of the invention, for unscrambling or decoding the scrambled television signal received from the transmitter of FIG. 1(*a*);

FIG. 2(*b*) is a graphical representation of the signal of FIG. 2(*a*) after being scrambled in the transmitter of FIG. 1(*a*);

FIG. 2(*c*) is a graphical representation of the television signal after being unscrambled or decoded at the receiver;

FIG. 3(*b*) is a schematic diagram in block form of a receiver containing means, according to a second embodiment of the invention, for unscrambling the television signal received thereat from the transmitter of FIG. 3(*a*)

Broadly described, the present invention provides a technique for unscrambling or decoding a received, scrambled or encoded television signal, in which an enabling signal must first be produced at the receiver to achieve unscrambling. In accordance with the invention, the unscrambling enabling signal is produced only upon the insertion of a program-select ticket into a program select and decoding network.

Figure 1A:
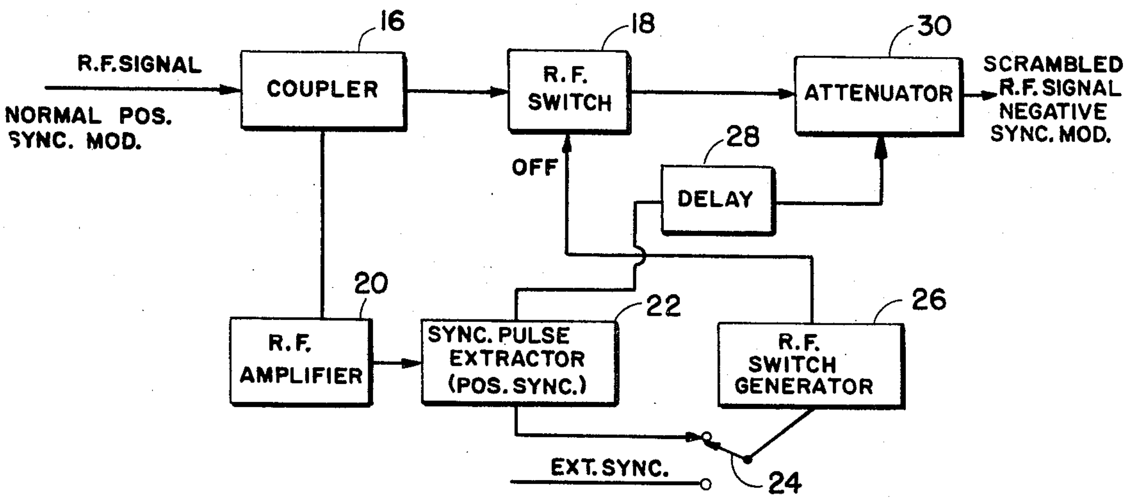
FIG. 1(*a*) is a schematic diagram in block form of a television transmitter containing means for scrambling or encoding the transmitted signal.
Figure 1B:
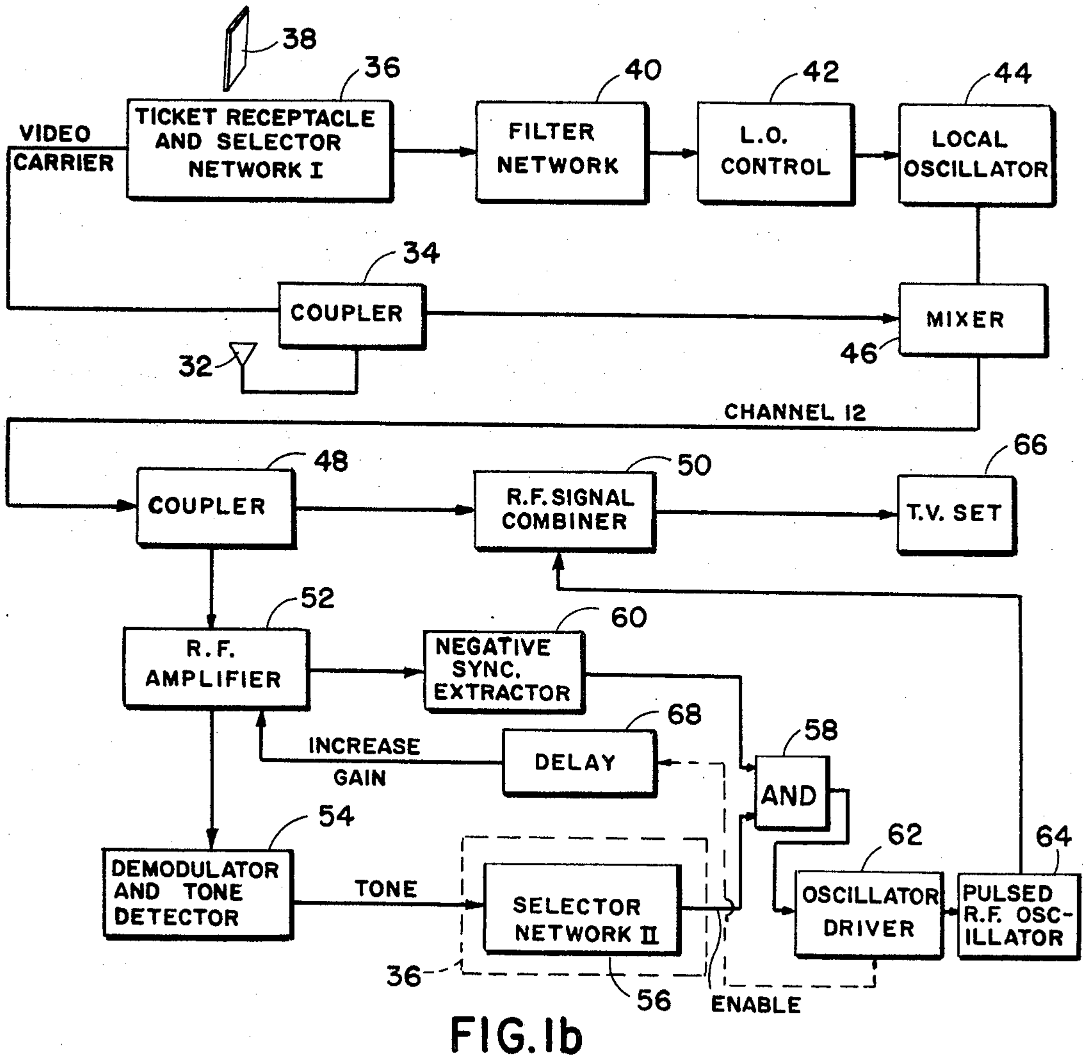
Figure 2A:
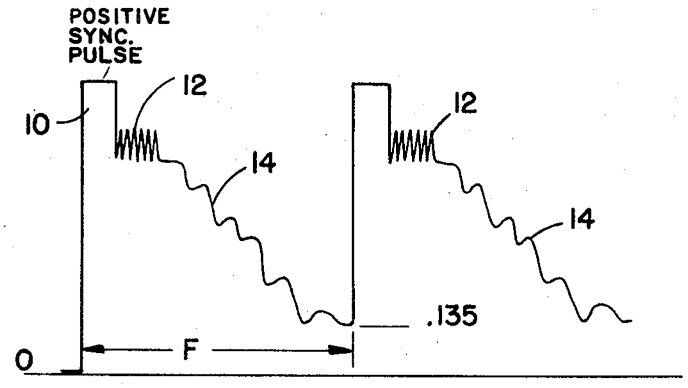
FIG. 2(*a*) is a graphical representation of a typical television signal.
Figure 2C:
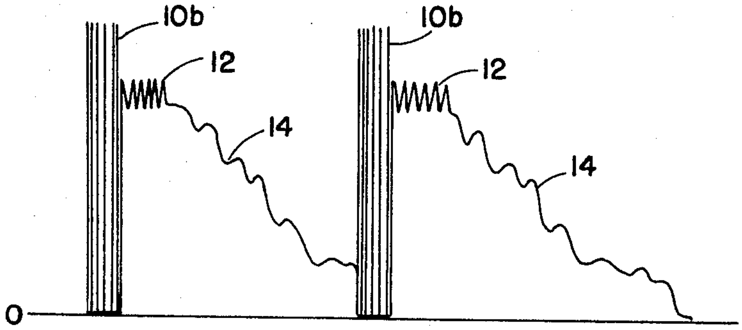

Referring now to the drawings, FIG. 1(*a*) illustrates schematically a television transmitter at which a television signal derived from a conventional source, such as a television camera or a video tape, is scrambled. As shown in FIG. 2(*a*), each frame of a typical television R. F. signal contains a synchronizing (sync) pulse 10 of a known duration followed by a color burst 12 at a lower amplitude than the sync pulse, which in turn is followed by the video or picture information 14 for that frame. In the transmitter of FIG. 1(*a*), the television signal is scrambled by removing the positive sync pulse at each occurrence thereof and substituting therefor a negative-going pulse.

To this end, as shown in FIG. 1(*a*), the input television signal is applied to a coupler 16, which in turn applies a portion of the R.F. television signal to an R.F. switch 18 and another portion of that signal to an R.F. amplifier 20. The input R.F. signal is also modulated by known means (not shown) by a suitable signal above the audio range, e.g. 15.750kHz, which in turn is modulated by an enabling tone at a specified frequency, e.g., 500 Hz. The output of amplifier 20 is in turn applied to a sync pulse extractor 22 which operates in a known manner to remove the positive sync pulse from the television signal.

The output of sync pulse extractor 22 is applied through a normally closed switch 24 to an R.F. switch generator 26. The latter upon the receipt of a sync pulse generates a disable signal which is applied to R.F. switch 18, to thereby turn off switch 18 during the interval of the positive sync pulse 10 of the input television signal.

As a result, the transmitted signal of the output of switch 18 is as shown in FIG. 2(*b*) in which the positive sync pulse is removed and replaced by what may be considered a negative or missing sync pulse **10*a***. Upon the receipt of this scrambled signal, from which the positive sync pulse is removed, the receiver vertical synchronizing circuitry will be unable to synchronize the incoming signal with the result being a scrambled and unintelligible picture.

In some instances, the amplitude of the color burst signal 12 may be almost as great as that of the positive sync signal, and may thereby cause the receiver vertical synchronization circuit to respond to the burst signal in the absence of the vertical synchronizing signal. To prevent this from occurring, the removed positive sync pulse may be applied, as shown, to a delay 28 which delays the removed sync signal by an amount equal to the period of that signal. The thus-delayed signal is applied to an attenuator 30 which, in response to that delayed signal, is enabled to attenuate the input scrambled television signal (which for that period consists of the color burst signal).

The receiver circuitry of FIG. 1(*b*) receives the encoded television signal from which the sync pulse has been removed as described above, and restores to that signal a simulated positive sync pulse which permits the television signal to be viewed on an ordinary television receiver. As shown in FIG. 1(*b*), the scrambled television signal is received at an antenna 32 (or transmitted through a cable), and applied to the input of a coupler 34. As described in said co-pending application, a portion of the incoming television signal is directed to a selector network 36 housed in the ticket-receiving receptacle into which a program select card or ticket 38 (described more completely in said co-pending application and below with reference to FIG. 4) is inserted by the subscriber-viewer.

Also as described in said co-pending application, network 36 includes one or more tuned circuits in which the capacitance is modified upon the insertion of the ticket into the receptacle. That ticket includes a first conducting region thereon which, when the ticket is inserted, is brought into close proximity to a pair of spaced, preferably co-planar capacitor plates, such that those plates and the adjacent ticket conducting area establish a unique value of capacitance and a corresponding unique, tuned circuit resonant frequency.

When that frequency corresponds to the carrier frequency of the television signal, network 36 passes a signal of that frequency to a series of filters in a filter network 40. One of a plurality of shunt-connected filters in network 40 has a pass band at that frequency and thereby passes a control signal to one of a corresponding plurality of control switches (e.g. SCR's) in L.O. control 42.

That control signal actuates one of the local oscillator control switches to in turn pass an enabling signal to one of a plurality of oscillators contained in a local oscillator network 44. Upon the presence of that enabling signal, the thus-enabled local oscillator produces a signal which is applied to one input of an R.F. mixer 46. The selection of the enabled local oscillator frequency by the insertion of the program select ticket, when mixed with the incoming, scrambled television signal produces, as a result of the operation of mixer 46, a still scrambled television signal having a translated carrier frequency at a designated, normally unused television channel, here channel 12.

That frequency-translated signal, which also includes the 15.750kHz modulating signal, is applied to the input of a coupler 48 which applies one portion of the signal to a signal combiner 50 and another portion to an R.F. amplifier 52. The output of amplifier 52 is in turn applied to a demodulator and a tone detector 54 which demodulates the input R.F. signal to recover the 15.750 kHz modulating signal and to thereafter detect the enabling tone (500 Hz) signal modulated thereon.

The tone signal, which is at a predetermined frequency that is unique to the broadcast television signal, is applied to a second tuned network 56 contained in the ticket receptacle. That second network includes a second tuned circuit which also includes a capacitance defined by a pair of spaced plates. The value of that capacitance is modified by a second conducting area provided on the subscriber's ticket (See FIG. 4) such that the second tuned circuit becomes resonant at the tone signal frequency, to thereby provide a decoder-enabling signal to one input of an AND gate 58. That is, an enabling signal is produced only when a program select ticket having a conducting region that establishes a value of effective capacitance at the second tuned circuit that in turn tunes that circuit to the frequency of the tone signal is inserted into the ticket receptacle.

The other output of R.F. amplifier 52 is applied to a negative sync extractor 60 which senses the negative-going sync pulse 10*a* (FIG. 2(*b*)) which results from the removal of the positive sync pulse in the transmitter of FIG. 1(*a*) as described above. Sync extractor 60 removes the negative sync pulse and produces in response thereto a drive signal which is applied to the other input of AND gate 58.

When both the enable and drive signals are present at the inputs of gate 58, that gate produces a signal that is applied to the input of an oscillator driver 62, which upon receipt of that signal, produces a pulsed control signal having a period corresponding to the sync pulse, which signal is applied to a pulsed R.F. oscillator 64.

Oscillator 64 is thereby pulsed into oscillation to produce a pulsed R.F. signal which is applied to the other input of combiner 50, such that the resulting output of combiner signal is as shown in FIG. 2(*c*), in which the pulsed R.F. signal is reinserted into the television signal as a simulated positive sync pulse 10*b* at the period of the removed sync pulse. The output of combiner 50, which is thus a restored television signal having a translated carrier frequency in the channel 12 range and a reconstructed positive sync pulse, is applied to the input of a conventional TV receiver 66 at which the normal television program can be viewed as desired.

In the event that transmitter of FIG. 1(*a*) includes the color burst attenuation circuitry described, the receiver of FIG. 1(*b*) must include, in addition to those components just described, a delay 68 that has an input coupled to the output of oscillator driver 64, and an output coupled to a gain-control terminal of amplifier 52, such that the gain of the R.F. signal at amplifier 52 during the period of the color burst is increased by an amount approximately equal to the attenuation provided by attenuator 30 at the transmitter during the color burst period.

In an alternate embodiment of the invention, the scrambling of the television signal at the transmitter is achieved by attenuating the amplitude of that signal at a known rate by the application of an interference signal. At the receiver, the signal is unscrambled upon the detection of an enabling signal by attenuating the scrambled received signal in an inverse manner to thereby unscramble the received television signal.

Figure 3A:
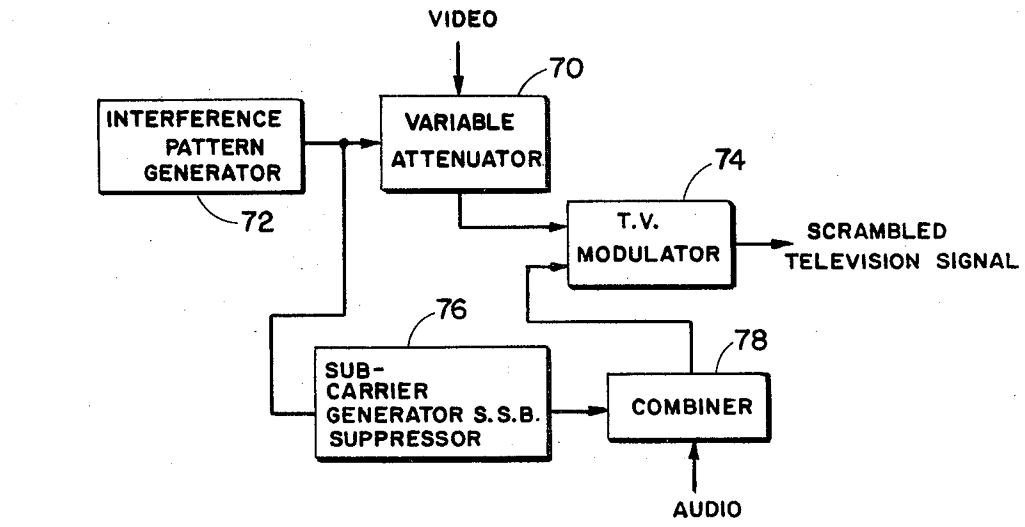
FIG. 3(*a*) is a schematic diagram in block form of a transmitter at which a television signal is scrambled or encoded according to an alternative technique.
Figure 3B:
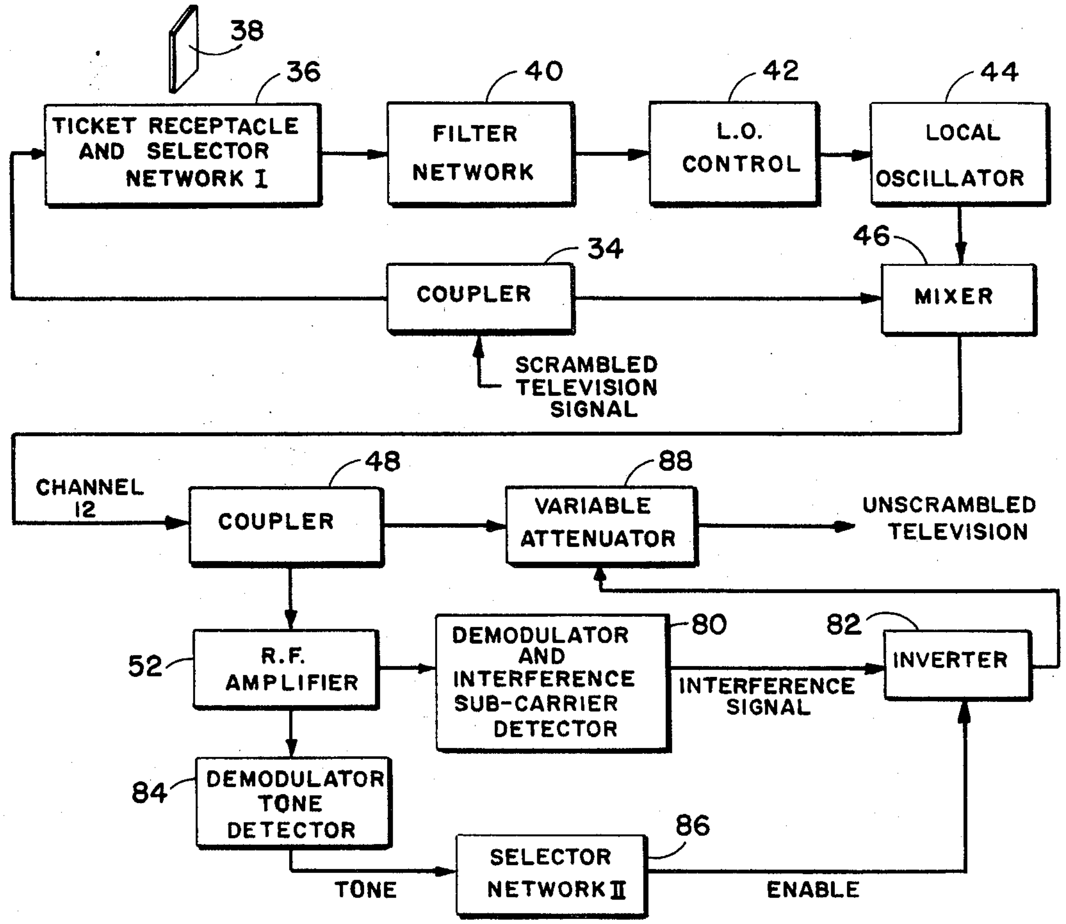

Referring now to the transmitter portion of this system illustrated in FIG. 3(*a*), the video portion of the input television signal is applied to one input of a variable attenuator 70. An interference pattern generator 72, which may be, as herein shown, an audio oscillator producing a signal at a frequency below 3kHz, is coupled to the control terminal of attenuator 70, such that the latter attenuates the input video signal to a varying extent as established by the instantaneous amplitude of the interference pattern signal from generator 72. The variable attenuated and thus scrambled video signal is applied to one input of a modulator 74.

The output of interference generator 72 is also applied to the input of a subcarrier generator and single side band (SSB) suppressor circuit 76. The generated subcarrier, which is preferably at a frequency of 15.750 kHz, is modulated by the interference pattern signal, and is in turn combined with the audio portion of the television signal in a combiner 78, the output of which is applied to the other input of modulator 74. The output of modulator 74 is thus a scrambled and normally unusable television signal that is transmitted either over the air or over a cable to the receiver of FIG. 3(*b*), at which the signal is unscrambled to permit the viewing thereof on a conventional television receiver.

The receiver-unscrambling or decoding system of FIG. 3(*b*) is similar at its front end to that shown in FIG. 1(*b*), and elements of the former corresponding to those in the latter are designated in these figures by similar reference numerals.

That is, in the receiver of FIG. 3(*b*), the frequency translated and still scrambled television signal developed in response to the first conducting region on the inserted program select ticket, is applied to the input of a coupler 48, the output of which is applied to the input of an R.F. amplifier 52. The amplified, scrambled signal is applied to one input of a demodulator and interference sub-carrier detector 80 which detects the interference pattern signal modulated on the 15.750 kHz sub-carrier at the transmitter. The thus detected interference pattern signal is applied to the input of a normally disabled inverted circuit 82. The amplified scrambled signal is also applied to the input of a demodulator and detector 84, which demodulates the audio carrier and the 15.750 kHz subcarrier, and detects the audio tone, which here corresponds to the interference signal that was applied to the subcarrier at the transmitter.

The detected enabling tone is applied to a second enabling signal network 86 contained in the ticket-receiving receptacle and which is similar to network 56 in the receiver and decoder of FIG. 1(*b*), in that it is tuned to the enabling tone frequency only when a program select ticket having the correct enabling-conducting area thereon is placed into the ticket receptacle. When the tuned-circuit capacitance of enabling network 86 is thus modified, it passes an enabling signal to inverter 82, which inverts or provides a 180° phase shift to the detected interference pattern signal. The inverted interference signal is applied to a variable attenuator 88, which is substantially identical to the variable attenuator 70 in the transmitter.

Since the control signal applied to variable attenuator 88 from inverter 82 is the inverse of the interference signal that controls the attenuation of the original television signal in attenuator 70, the output of attenuator 88 is a reconstructed version of the original video signal. The thus restored or unscrambled television signal at the output of variable attenuator 88 is applied to a conventional television receiver at which the broadcast program can be viewed in its original form on a designated, normally idle, channel, e.g., channel 12. In the embodiment of FIG. 3(*b*), the decoder enabling signal is derived from the interference signal. It is understood, that in the event the interference signal is other than a sine wave, the encoding signal may take the form of a separate signal transmitted along with the interference signal and detected at the receiver under the control of a program select ticket in the manner described.

Figures 2B, 4:
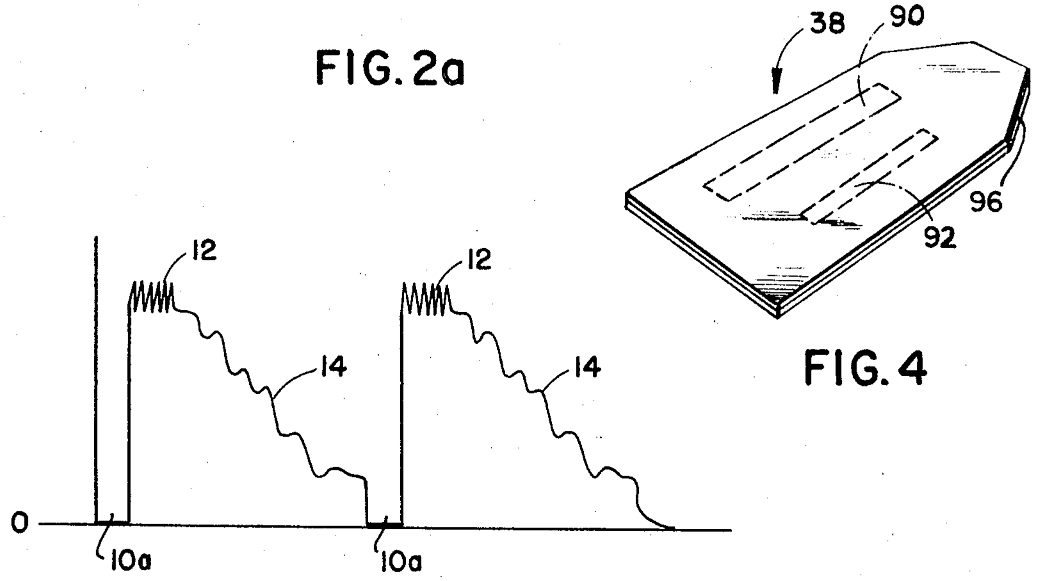
FIG. 4 is a perspective view of a program select ticket for us in the unscrambling portions of the receivers of FIG. 1(*b*) and 3(*b*).

A typical program select ticket for use in controlling the receiver-decoder of FIGS. 1(*b*) and and/or 3(*b*) is illustrated in FIG. 4, and is similar to the program select ticket described in the said co-pending application. As shown, card 38 comprises a two-layer laminate formed of a suitable insulating material. When the ticket is inserted into the ticket receptacle, the two conducting areas or regions 90 and 92 which are respectively positioned adjacent the network tuned circuit capacitances to modify the value of those capacitances in the manner described above and thereby respectively permit a. the carrier frequency of the transmitted television signal to be translated to that of the designated viewing channel, and b. to produce an enabling signal that decodes or unscrambles the scrambled frequency-translated signal.

One end of the program select ticket is preferably tapered as indicated at 96 to ensure proper orientation of the conducting areas on the inserted ticket with respect to the network capacitances.

The transmitted program can be viewed in a normal manner so long as the program select ticket remains in position in the ticket receptacle and the carrier frequency and enabling tone frequency developed at the transmitter both remain unchanged. In a typical transmitting scheme, the transmitted program, such as a first-run movie, may be repeated several times each day for a specified period, during which period the carrier and enabling frequencies remain constant.

To terminate reception and unscrambling of the scrambled signal, the transmitted signal may further include an end-of-program signal, which as described in said co-pending application, may terminate either or both of the translating or enabling signals, and cause the automatic destruction of the ticket within the receptacle.

In addition, when a new program is to be broadcast for which the purchase of a new program select ticket by the subscriber is required, one or both of the translating and enabling tone frequencies may be varied at the transmitter so that the program will either not be received at all at the designated channel, or it will be received, but only in a scrambled and unintelligible manner until the proper ticket is inserted into the ticket receptacle.

The present invention thus satisfies the several objects set forth hereinabove in that it permits a scrambled signal to be unscrambled and viewed upon the insertion into a suitable receptacle of a program select ticket which has been previously purchased by the subscriber, much in the manner as he would purchase a ticket to a movie, theatrical presentation, concert, or sports event. Since each ticket may be sold separately or in a group, a different price may be charged for different tickets, depending on the value of the program that may be viewed by that ticket, and the operators of the system may thus set the prices for the ticket at levels commenusrate with their program schedule. This capability has not heretofore been available to operators of pay television systems in which scrambling of the television signal is performed at the transmitter.

Although the invention has been herein specifically described with respect to presently preferred embodiments, it will be apparent that variations of the invention may be made without necessarily departing from the spirit and scope of the invention.

What is claimed is:

1. In a television communication system comprising a transmitter and a receiver, said transmitter including means for scrambling a television signal by amplitude modulating the television signal with a scrambling signal, and means for amplitude modulating the television signal with a coding signal having a preselected parameter, said receiver comprising means for demodulating the received television signal, means for detecting said coding signal, means coupled to said demodulating means and effective when enabled to unscramble the received television signal, and means coupled to said detecting means for producing an enabling signal, said enabling signal producing means including means for comparing said parameter of said detected coding signal with a reference parameter established in said enabling signal producing means, and means for developing said enabling signal upon a predetermined relationship between said reference parameter and said coding signal parameter, said enabling signal producing means comprising a receptacle for receiving a program select member, said member having a first conducting pattern thereon, said receptacle including a second conducting pattern located adjacent and electrically non-contacting said first conducting pattern when said program select member is received in said receptacle, said reference parameter being produced when said program select member is inserted in said receptacle and being a representation of said first and second conducting patterns, and means for applying said enabling signal to said unscrambling means, thereby to enable the latter and unscramble the received television signal.

2. In the system of claim 1, in which said reference parameter is frequency, said receptacle including a tuned circuit having a tuning parameter normally establishing the resonant frequency of said tuned circuit different than said reference signal frequency, said first conducting pattern on said program select member being effective when said member is placed in said receptacle to vary said tuned circuit parameter, to thereby establish the resonant frequency of said tuned circuit at said reference signal frequency.

3. In the system of claim 2, in which said coding signal applying means includes means for modulating a subcarrier signal with said coding signal, said detecting means at said receiver comprising means for demodulating said subcarrier signal.

4. In the system of claim 2, in which said transmitter includes means for removing the positive sync pulse from the television signal, and said unscrambling means at said receiver includes means for producing a pulsed R.F. signal having a duration approximately equal to that of said removed sync signal, and means for combining said pulsed R.F. signal and the received scrambled television signal when said unscrambling means is enabled, to thereby restore a positive sync signal to the received scrambled television signal.

5. In the system of claim 4, in which said R.F. signal producing means comprises means for extracting a negative sync signal from said received scrambled signal and for producing a drive signal in response thereto, a pulse oscillator, and logic means coupled to said oscillator, said network, and said drive signal producing means for actuating said pulsed oscillator upon the simultaneous presence thereat of said drive signal and said enabling signal.

6. In the system of claim 5, in which said transmitter further includes means for attenuating the television signal during the occurrence of a color burst therein, and said receiver further comprises means for amplifying said received signal during the period of the color burst therein.

7. In the system of claim 2, in which said signal scrambling means comprises means for producing an interference signal having an amplitude varying in a predetermined arbitrary manner, and means coupled to said interference signal producing means for modifying the amplitude of the input television signal in accordance with the amplitude of said interference signal, said unscrambling means at said receiver comprising means for modifying the amplitude of said received television signal in a substantially inverse manner to that of said amplitude modifying means at said transmitter.

8. In the system of claim 7 in which said transmitter includes means for amplitude-modulating the television signal with said interference signal, said unscrambling means at said receiver comprising second demodulating means for detecting said interference signal, means coupled to said second demodulating means effective when enabled to invert said detected interference signal, means effective upon the presence of said enabling signal to enable said inverting means, and means coupled to said inverting means to apply the inverted interference signal to said amplitude modifying means at said receiver.

9. In the system of claim 1, in which said scrambling means at said transmitter includes means for removing the positive sync pulse from said television signal, and said unscrambling means at said receiver includes means for producing an R.F. signal having a duration approximately equal to that of said removed sync signal, and means for combining said R.F. signal and the received scrambled television signal when said unscrambling means is enabled, to thereby restore a positive sync signal to said received scrambled television signal.

10. In the system of claim 9, in which said R.F. signal producing means comprises means for extracting a negative sync signal from said received scrambled signal and for producing a drive signal in response thereto, a pulsed oscillator, and logic means coupled to said oscillator, said network, and said drive signal producing means for actuating said pulsed oscillator upon the simultaneous presence thereat of said drive signal and said enabling signal.

11. In the system of claim 1, in which said signal scrambling means comprises means for producing an interference signal having an amplitude varying in a predetermined arbitrary manner, and means coupled to said interference signal producing means for modifying the amplitude of the input television signal in accordance with the amplitude of said interference signal, said unscrambling means at said receiver comprising means for modifying the amplitude of said received television signal in a substantially inverse manner to that of said amplitude modifying means at said transmitter.

12. In the system of claim 11, in which said transmitter includes means for amplitude-modulating the television signal with said interference signal, said unscrambling means at said receiver comprising second demodulating means for detecting said interference signal, means coupled to said second demodulating means for inverting said detected interference signal, and means effective when enabled by said enabling signal to apply an inverted interference signal to said amplitude modifying means at said receiver.

* * * * *